United States Patent
Lim

(10) Patent No.: US 12,183,137 B2
(45) Date of Patent: Dec. 31, 2024

(54) UWB DEVICE AND CONTROL METHOD THEREOF

(71) Applicant: HYUNDAI MOBIS CO., LTD., Seoul (KR)

(72) Inventor: Jong Chul Lim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 85 days.

(21) Appl. No.: 18/086,020

(22) Filed: Dec. 21, 2022

(65) Prior Publication Data
US 2023/0206705 A1    Jun. 29, 2023

(30) Foreign Application Priority Data
Dec. 27, 2021 (KR) .......................... 10-2021-0188614

(51) Int. Cl.
*G07C 9/00* (2020.01)

(52) U.S. Cl.
CPC .................. *G07C 9/00309* (2013.01); *G07C 2009/00373* (2013.01)

(58) Field of Classification Search
None
See application file for complete search history.

(56) References Cited

U.S. PATENT DOCUMENTS

| | | | | |
|---|---|---|---|---|
| 8,874,182 B2 * | 10/2014 | Etzkorn | ........... | B29D 11/00038 205/792 |
| 11,289,946 B2 * | 3/2022 | Abdelraheem | ....... | H02J 50/001 |
| 2019/0308615 A1 * | 10/2019 | Lavoie | ............... | B62D 15/0285 |
| 2020/0137676 A1 * | 4/2020 | Yoon | .................. | H04W 64/006 |
| 2020/0366335 A1 * | 11/2020 | Lee | ........................ | H04W 88/06 |
| 2023/0206705 A1 * | 6/2023 | Lim | .................... | G07C 9/00309 340/5.61 |

FOREIGN PATENT DOCUMENTS

| | | | | | |
|---|---|---|---|---|---|
| AU | 2013342051 | A1 | * | 5/2015 | ......... H04L 12/1845 |
| CA | 3084167 | A1 | * | 6/2019 | ......... G06K 19/0723 |
| CN | 105577969 | B | * | 4/2019 | ........... G06F 1/3231 |
| EP | 3644088 | A1 | * | 4/2020 | ............. G01S 13/02 |
| EP | 4 137 838 | A2 | | 2/2023 | |
| EP | 4 145 175 | A1 | | 3/2023 | |
| KR | 20210007810 | A | * | 1/2021 | ........... B60R 16/023 |
| KR | 10-2021-0137841 | A | | 11/2021 | |

OTHER PUBLICATIONS

Extended European search report issued on Apr. 6, 2023, in counterpart European Patent Application No. 22215848.7 (10 pages in English).

European Office Action issued on Dec. 12, 2023, in counterpart European Patent Application No. 22 215 848.7 (13 pages).

* cited by examiner

*Primary Examiner* — Fekadeselassie Girma
(74) *Attorney, Agent, or Firm* — NSIP Law

(57) ABSTRACT

An ultra-wide band (UWB) device including a memory configured to store one or more instructions, a communications part configured to perform UWB communications with a mobile device, one or more processors configured to execute the one or more instructions to perform a ranging together with the mobile device on basis of a reception window, counts a standby counter wherein when the ranging fails, and enter a sleep mode when the standby counter is equal to or greater than a maximum standby count.

9 Claims, 3 Drawing Sheets

| Test Case | 1 Min | 2 Min | 3 Min | 4 Min | 5 Min | 6 Min | 7 Min | 8 Min | 9 Min | 10 Min |
|---|---|---|---|---|---|---|---|---|---|---|
| 2ms / 2ms | OK | NG | NG | NG | NG | NG | NG | NG | NG | NG |
| 5ms / 5ms | OK | OK | NG | NG | NG | NG | NG | NG | NG | NG |
| 10ms / 10ms | OK | OK | OK | OK | OK | NG | NG | NG | NG | NG |

FIG. 2

UWB DEVICE AND CONTROL METHOD THEREOF

CROSS-REFERENCE TO RELATED APPLICATION

This application claims the benefit under 35 USC § 119(a) of Korean Patent Application No. 10-2021-0188614, filed on Dec. 27, 2021, in the Korean Intellectual Property Office, the entire disclosure of which is incorporated herein by reference for all purposes.

BACKGROUND

1. Field

The present disclosure relates to a UWB device and a control method thereof to minimize unnecessary power consumption caused by infinite standby of a UWB signal that cannot be covered.

2. Description of the Related Art

In general, a smart key (SMK) system locates a smart key (or a key fob), controls locking/unlocking of a vehicle door, and starts a vehicle using low frequency (LF, 125 kHz) or radio frequency (RF, 434 MHz) technology.

Some technologies, such as the global positioning system (GPS), Wi-Fi, and Bluetooth®, are used in order to provide local based services (LBSs), in which it is difficult to enable precise measurement. In contrast, ultra-wideband (UWB) has advantages such as a wide frequency band, low power communication, and high-precision positioning on a level of tens of centimeters.

Here, the UWB is a technology for calculating the distance between communicating parties by multiplying a signal travel time between the communicating parties by the velocity of light using time of flight (ToF) technology.

Conventional position tracking technologies based on the GPS and mobile communications networks have an error range of approximately 5 m to 50 m and 50 m to 200 m, respectively. With the GPS, a satellite signal may fail to reach a GPS receiver in a dense cluster of buildings in a city.

Here, Wi-Fi technology may enable position tracking at low cost. However, with increases in the number of objects to be tracked, channel division may be limited, since the available frequency band is narrow. In addition, the connection of a mobile terminal to a stationary access point (AP) may be disconnected.

Bluetooth® technology enables a plurality of sensors to be disposed at low cost. However, due to high communication latency, Bluetooth® technology is not suitable for real-time positioning tracking in a dynamic environment.

In contrast, UWB technology uses a wide frequency band unlike Wi-Fi technology or Bluetooth® technology, and can transmit a large amount of information with low power and at a high transmission rate.

Positioning using UWB technology has advantages, such as a low error range on a level of about 20 cm, high transmittance with respect to obstacles, and the ability to not be influenced by other signals, for example, Wi-Fi signals.

Here, an operation of measuring the distance between a fob (or a key fob) and an anchor is referred to as ranging. In this case, a data structure is based on the IEEE802.15.4z standard, and about 200 μs is taken for the transmission of one packet. In addition, a slot is defined as an amount of time taken for the fob or the anchor to transmit a following signal (or receive a signal) after transmitting a signal once.

When ranging is performed using UWB technology as described above, the anchor opens a receiver window before an expected reception time by RX_MARGIN_TIME (e.g., 10 ms) for standby of a signal allocated to each slot, and maintains the receiver window opened after the expected reception time by RX_TIMEOUT (e.g., 10 ms).

The reason for which the receiver window is opened before and after the expected reception time is to overcome a time error that would otherwise be caused by the difference of the clock CLK between a smartphone and the anchor.

For example, when the clock CLK of the smartphone performing the ranging once every 500 ms has a time error of +1000 ppm and the clock CLK of the anchor has a time error of −1000 ppm, a clock difference of 2000 ppm (=1 ms) per 500 ms occurs. Thus, the time for which the ranging may be continued may vary depending on the length of the receiver window.

In this case, when a set value is RX_MARGIN_TIME (e.g., 10 ms)+RX_TIMEOUT (e.g., 10 ms)=20 ms, the ranging may be only continued 20 times every 500 ms.

In this manner, when the RX_MARGIN_TIME/RX_TIMEOUT time of the receiver window is longer, the ranging may be continued for a longer time. In contrast, unnecessary consumption of power (or current) increases by the time during which the receiver window is opened, which may be problematic.

In addition, according to physical characteristics of UWB communication, it is highly probable that an anchor opposite to a vehicle with respect to the smartphone may fail wireless communication due to the vehicle acting as an obstacle through metal components included therein.

Thus, even in the case in which the anchor opposite to the vehicle is standing by for the ranging, when a reception signal is not continuously provided at actual estimated times, the time error between the smartphone and the anchor caused by the difference of the clock CLK accumulates. In this case, when the ranging succeeds at an estimated reception time, the time error occurring/accumulated due to the difference of the clock is reset with respect to the succeeded time. However, in the case that the ranging has successively failed, the time error is accumulated.

When the ranging every 500 ms has failed 20 times, the ranging may not succeed even in the case that the smartphone has entered a radio communication available area. That is, while the anchor operates, substantially all ranging attempts fail, thereby consuming power needlessly

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided an ultra-wide band (UWB) device, the device including a memory configured to store one or more instructions, a communications part configured to perform UWB communications with a mobile device, one or more processors configured to execute the one or more instructions to perform a ranging together with the mobile device on basis of a reception window, counts a standby counter wherein when the ranging fails, and enter a sleep mode when the standby counter is equal to or greater than a maximum standby count.

When the ranging succeeds, the one or more processors may be further configured to clear the standby counter.

When the ranging succeeds, the one or more processors may be further configured to output a result of the ranging.

The maximum standby count may be set according to the reception window.

The mobile device may include at least one of a key fob and a smart phone.

In another general aspect, here is provided a control method of an electronic device for controlling an ultra-wide band (UWB) device, the control method including performing, by a processor, ranging together with a mobile device on a basis of a reception window, counting, by the processor, a standby counter when the ranging performed by the processor fails, clearing, by the processor, the standby counter when the ranging performed by the processor succeeds, and comparing, by the processor, the standby counter with a maximum standby count, and repeating the ranging or entering a sleep mode.

The maximum standby count may be set according to the reception window.

The control method may also include outputting, by the processor, a result of the ranging when the ranging succeeds.

The repeating of the ranging or the entering of the sleep mode may include comparing the standby counter with the maximum standby count, repeating the ranging when the standby counter may be less than the maximum standby count, and entering the sleep mode when the standby counter may be equal to or greater than the maximum standby count.

BRIEF DESCRIPTION OF THE DRAWINGS

FIG. 2 is a table illustrating the results of tests of times in which the UWB device according to an embodiment of the present disclosure may return when ranging fails depending on the receiver window.

Figure 1:
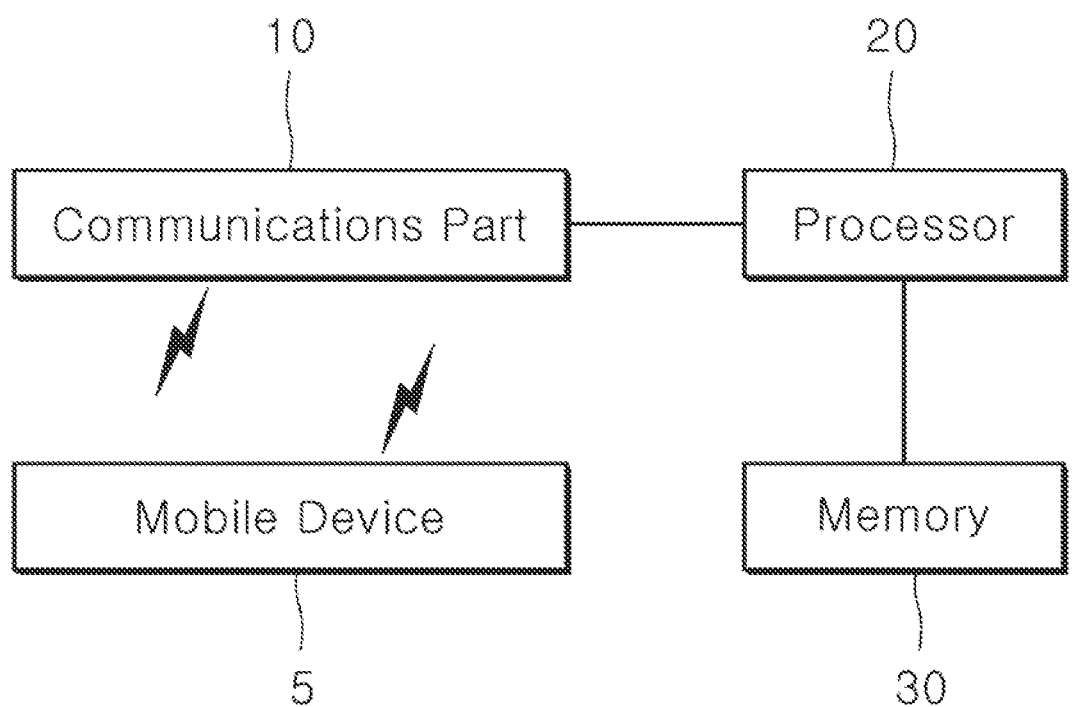
FIG. 1 is a block diagram illustrating a configuration of a UWB device according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

FIG. 1 is a block diagram illustrating a configuration of a UWB device according to an embodiment of the present disclosure, and FIG. 2 is a table illustrating the results of tests of times in which the UWB device according to an embodiment of the present disclosure may return when ranging fails depending on the receiver window.

As illustrated in FIG. 1, the UWB device according to an embodiment of the present disclosure may include a communications part 10 (for example, a communications system), a memory 30, and a processor 20. Communications part 100 may include, for example, a mobile device configured to transmit and receive communications, including a smart phone and a key fob.

The communications part 10 may transmit and receive a packet to and from a mobile device 5 on the basis of UWB communication. The communications part 1 may be implemented as a module, a device, a circuit, an antenna, or the like for UWB communication. The configuration of the communications part 10 may be realized using a technology well-known in the technical field to which the present disclosure pertains, and thus a further detailed description thereof will be omitted.

Here, the mobile device 5 may include at least one of a key fob and a smartphone.

The memory 30 may have a ranging program stored therein, and a maximum standby count set according to the reception window may be stored in the memory 30.

Here, the maximum standby count is a reception standby time in which ranging may fail even in the case in which a standby operation is performed by adjusting the reception window. The maximum standby count may be used to set a termination time at which the standby operation is terminated instead of being infinitely performed.

For example, FIG. 2 is a table illustrating actual test measurements of times in which the UWB device may return to a normal mode when the ranging has successively failed in a situation in which the reception windows RX_MARGIN_TIME/RX_TIMEOUT are 2 ms/2 ms, 5 ms/5 ms, and 10 ms/10 ms, respectively. Here, there may be variations in elements according to anchor samples as well as variations according to smartphone manufacturers/samples.

As illustrated in FIG. 2, when the reception window is 2 ms/2 ms, it can be appreciated that, when returning to the normal mode has failed through repetition of about 1 minute, the ranging will fail successively even in the case the standby operation is performed for 10 minutes. In addition, when the reception window is 10 ms/10 ms, it can be appreciated that, when returning to the normal mode has failed through repetition of about 5 minutes, the ranging will fail successively.

Thus, when the reception window is 10 ms/10 ms, the maximum standby count may be set to be 5 minutes or 1,000 times.

For example, when the ranging is performed once every about 300 ms, the ranging may be performed 1,000 for 300,000 ms (=300 seconds=5 minutes). Therefore, when the ranging has failed successively for 1,000 times, it is meaningless to maintain the reception standby mode for the ranging in current reception window conditions (RX_MARGIN_TIME/RX_TIMEOUT=10 ms/10 ms), since the ranging fails due to the distorted window.

Thus, the ranging reception standby time may be set in reception window conditions and maximum standby count conditions, thereby minimizing needless consumption of power.

The processor 20 may execute the program stored in the memory 30.

That is, the processor 20 may perform the ranging together with the mobile device 5 on the basis of the reception window. Here, performing the ranging is a technology well-known in the technical field to which the present disclosure pertains, and thus a further detailed description thereof will be omitted.

When the ranging fails, the processor 2 counts a standby counter. Here, when the ranging succeeds at least once, the standby counter is cleared and the result of the ranging is output.

In this manner, the processor 20 counts the standby counter while performing the ranging. When the ranging fails and the standby counter is equal to or greater than the maximum standby count, the processor 20 may exit the reception standby mode for the ranging and enter a sleep mode.

As described above, in the UWB device according to an embodiment of the present disclosure, when the anchor in the UWB device has successively failed the ranging, the UWB device enters the sleep mode by setting the maximum standby count corresponding to the reception window. In this manner, the UWB device may minimize unnecessary consumption of power that would otherwise be caused by infinite standby of a UWB signal that cannot be covered.

Figure 3:
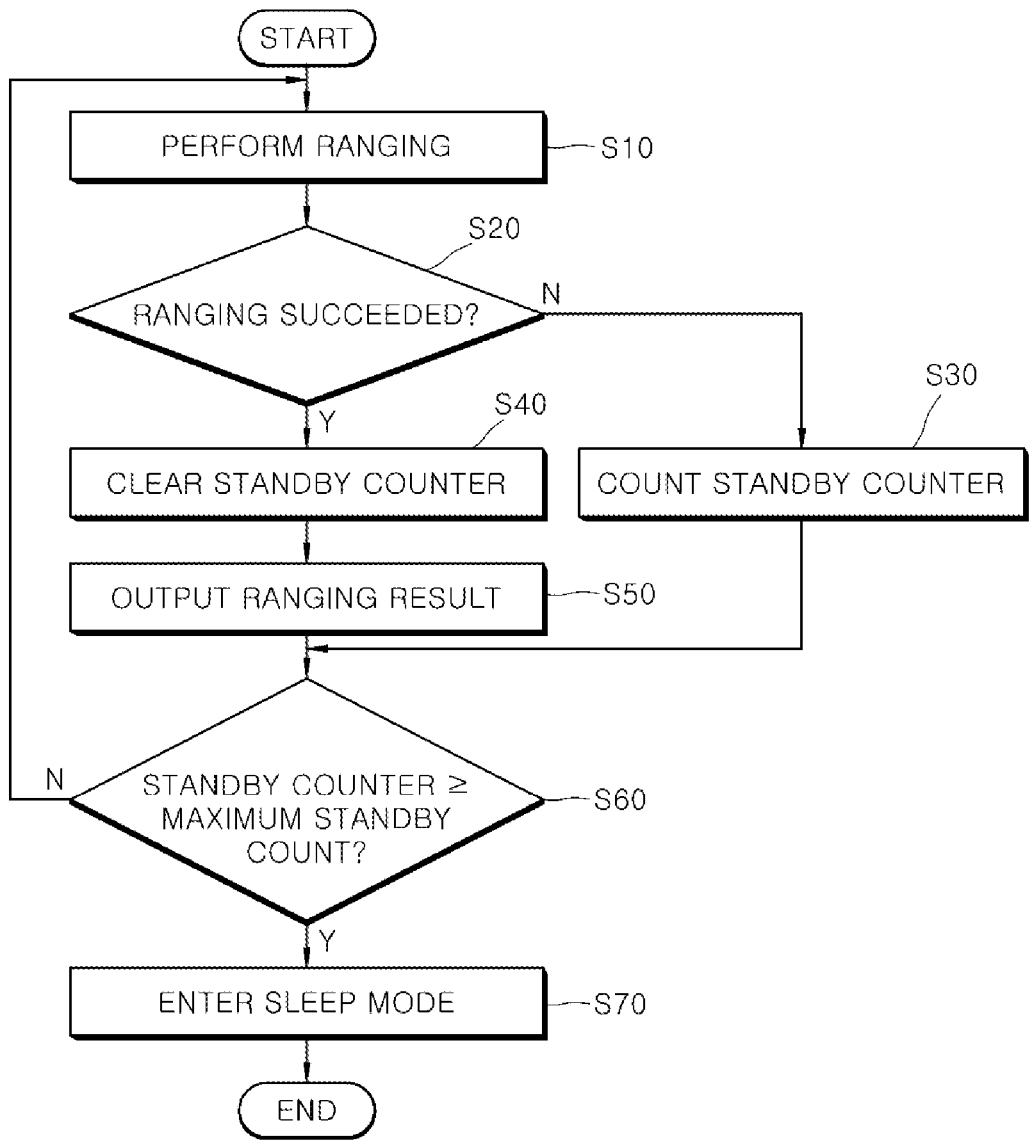
FIG. 3 is a flowchart illustrating a control method of a UWB device according to an embodiment of the present disclosure.

FIG. 3 is a flowchart illustrating a control method of a UWB device according to an embodiment of the present disclosure.

As illustrated in FIG. 3, in the control method of a UWB device according to an embodiment of the present disclosure, first, the processor 20 performs ranging together with a mobile device on the basis of a reception window set for UWB ranging in S10.

After the ranging is performed in step S10, the processor 20 determines whether or not the ranging has succeeded in S20.

When the ranging fails instead of succeeding in step S20, the processor 20 counts a standby counter in S30.

In contrast, when the ranging succeeds in step S20, the processor 20 clears the standby count in S40.

In addition, the processor 20 outputs the result of the ranging in S50.

After the standby counter is counted in step S30 in response to the failure of the ranging in step S30 or when the result of the ranging is output in response to the success of the ranging in step S20, the processor 20 compares a maximum standby count with the standby counter in S60.

Here, the maximum standby count is a reception standby time in which the ranging may fail even in the case in which a standby operation is performed by adjusting the reception window. The maximum standby count may be used to set a termination time at which the standby operation is terminated instead of being infinitely performed.

When the standby counter is equal to or greater than the maximum standby count as the result of the comparison of the maximum standby count with the standby counter in step S60, the processor 20 exits the reception standby mode and enters a sleep mode in S70.

When the standby counter is less than the maximum standby count as the result of the comparison of the maximum standby count with the standby counter in step S60, the processor returns to step S10 to perform the ranging.

In the control method of a UWB device according to an embodiment of the present disclosure as described above, when the anchor in the UWB device has successively failed the ranging, the UWB device enters the sleep mode by setting the maximum standby count corresponding to the reception window. In this manner, the UWB device may minimize unnecessary consumption of power that would otherwise be caused by infinite standby of a UWB signal that cannot be covered Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An ultra-wide band (UWB) device, comprising:
   a memory configured to store one or more instructions;
   a communications part configured to perform UWB communications with a mobile device;
   one or more processors configured to execute the one or more instructions stored in the memory, thereby configuring the one or more processors to:
   perform a ranging together with the mobile device based on a reception window,
   count a standby counter when the ranging fails;
   clear the standby counter when the ranging succeeds; and
   enter a sleep mode when the standby counter is equal to or greater than a maximum standby count.

2. The UWB device of claim 1, wherein the one or more processors count the standby counter while performing the ranging.

3. The UWB device of claim 1, wherein, when the ranging succeeds, the one or more processors are further configured to output a result of the ranging.

4. The UWB device of claim 1, wherein the maximum standby count is set according to the reception window.

5. The UWB device of claim 1, wherein the mobile device comprises at least one of a key fob and a smart phone.

6. A control method for controlling an ultra-wide band (UWB) device, the control method comprising:
   performing, by a processor, a ranging together with a mobile device based on a reception window;
   counting, by the processor, a standby counter when the ranging performed by the processor fails;
   clearing, by the processor, the standby counter when the ranging performed by the processor succeeds; and
   comparing, by the processor, the standby counter with a maximum standby count, and repeating the ranging or entering a sleep mode.

7. The control method of claim 6, wherein the maximum standby count is set according to the reception window.

8. The control method of claim 6, further comprising outputting, by the processor, a result of the ranging when the ranging succeeds.

9. The control method of claim 6, wherein the repeating of the ranging or the entering of the sleep mode comprises:
   comparing the standby counter with the maximum standby count;
   repeating the ranging when the standby counter is less than the maximum standby count; and
   entering the sleep mode when the standby counter is equal to or greater than the maximum standby count.

* * * * *